United States Patent [19]
Weber et al.

[11] Patent Number: 6,074,482
[45] Date of Patent: Jun. 13, 2000

[54] DEVICE FOR COATING DISC-SHAPED INFORMATION STORAGE MEDIA

[75] Inventors: Klaus Weber, Bretten; Jürgen Kallis, Mühlacker, both of Germany

[73] Assignee: Steag Hamatech AG, Germany

[21] Appl. No.: 09/091,076

[22] PCT Filed: Sep. 13, 1996

[86] PCT No.: PCT/EP96/04022

§ 371 Date: Jun. 8, 1998

§ 102(e) Date: Jun. 8, 1998

[87] PCT Pub. No.: WO97/21495

PCT Pub. Date: Jun. 19, 1997

[30] Foreign Application Priority Data

Dec. 8, 1995 [DE] Germany .......................... 195 45 943

[51] Int. Cl.[7] .................. B05C 9/14; F26B 3/22
[52] U.S. Cl. .................. 118/642; 427/558; 427/240; 34/275; 250/492.1
[58] Field of Search .................. 427/240, 558; 118/642; 34/275–278; 250/492.1, 504 R, 455.11

[56] References Cited

U.S. PATENT DOCUMENTS

| | | | |
|---|---|---|---|
| 3,982,527 | 9/1976 | Cheng et al. | 126/270 |
| 3,984,726 | 10/1976 | Ramler | 315/107 |
| 5,136,170 | 8/1992 | Gellert | 250/492.1 |
| 5,411,588 | 5/1995 | Diepens et al. | 118/666 |

FOREIGN PATENT DOCUMENTS

| | | |
|---|---|---|
| 80117 | 1/1951 | Czechoslovakia . |
| 0449018 | 10/1991 | European Pat. Off. . |
| 61-22272 | 3/1985 | Japan . |
| 62-18804 | 2/1986 | Japan . |
| 6052575 | 7/1992 | Japan . |

*Primary Examiner*—Shrive Beck
*Assistant Examiner*—Michael Cleveland
*Attorney, Agent, or Firm*—Robert W. Becker & Associates

[57] ABSTRACT

A device for coating disc-shaped information storage media with a coating medium has a drying station having an UV lamp for drying the applied coating medium. The UV lamp is arc-shaped and has a radius that is greater than a radius of the disc-shaped information storage media.

11 Claims, 1 Drawing Sheet

DEVICE FOR COATING DISC-SHAPED INFORMATION STORAGE MEDIA

This application is a 371 of PCT/EP96/04022, filed Sep. 13, 1996.

BACKGROUND OF THE INVENTION

The invention relates to a device for coating disc-shaped information storage media with a coating medium whereby a drying station for drying the applied coating medium is provided that has an ultraviolet (UV) lamp.

Disc-shaped information storage media are, for example, compact discs (CDs), magneto-optical discs, CD-ROMs, CD-Rs, photo and/or video discs. In the following these discs are referred to as disc-shaped information storage media or storage media for short.

Devices of the aforementioned kind are produced and distributed by the assignee of this patent. FIG. 3 shows a schematic representation of the device, respectively, of the sequence of the coating and drying process at the respective stations of such a device.

A supply station 1 transfers the disc-shaped information storage media 2 to a manipulation device 3, in the shown embodiment a so-called process cup gripper, having gripper arms 4,5 facing the supply station 1 which grip the storage media 2 provided by the supply station 1 and transport them to the coating stations 6,7 of a processing unit 8. After coating of the storage media 2 with a coating medium, for example, a coating lacquer, the storage media 2 are transported with gripper arms 10,11 facing the drying station 9 to a receiving position 12 from where they are transported into a drying chamber 13. In the drying chamber 13 a non-represented rod-shaped UV lamp is provided above the rotating storage medium 2 in order to dry or cure the coating medium. The heat generated in the drying chamber 13 by the UV lamp is removed by a (non-represented) air suction or recirculating device.

After the drying process the storage medium 2 is removed from the drying chamber 13 and brought into a position 14 within the drying station where a further gripper 15 grips it and transports it to the receiving station 16.

The above disclosed coating device for disc-shaped information storage media have been used with great success for producing such storage media.

From EP 0 449 018 A2 a radiation device for drying and/or curing of paints or lacquers by a UV lamp is known which are provided in the form of plates or circular concentric tubes. The embodiments of such radiation devices are selected with respect to the function of the radiation device itself, but not with respect to the shape or optimal irradiation of an object to be irradiated.

The invention has therefore the object to further improve coating devices for disc-shaped information storage media and, especially, to provide devices which, per time unit, allow for more coating steps, are more reliable and require less downtime, and provide a reduced manufacturing and servicing expenditure especially for the drying station.

SUMMARY OF THE INVENTION

Based on such a device of the aforementioned kind the above object is solved in that the UV lamp of the drying station is shaped as a circular arc portion and the radius of the circular arc portion of the UV lamp is greater than the radius of the disc-shaped information storage medium. This has the following advantages.

The conventional rod-shaped UV lamps for the drying station emit UV light that is not positioned optimally with respect to the disc-shaped information storage medium whose coating must be dried. This means that the drying efficiency of conventional rod-shaped UV lamps is low. Thus, a rod-shaped UV lamp of high output must be used in order to ensure the drying of the coating medium during a predetermined amount of time. This has the disadvantage that the storage medium is heated to high temperatures of up to 70° C. The storage medium buckles or becomes curved and does not remain planar so that subsequent to the drying process measures must be taken in order to free the storage media from such distortions and to make them planar again. With a circular arc-shaped UV lamp according to the present invention the light is better positioned relative to the disc-shaped storage medium so that a UV lamp of reduced output can be used, and/or within the same or a reduced amount of time, for drying the coating medium. Accordingly, the storage medium is no longer heated to temperatures at which distortions, bending or buckling occur. With a circular arc-shaped UV lamp it is possible to maintain the temperature of the storage medium during the drying process substantially lower and not much higher than room temperature. A hot air removal or recirculating device for removing heat is no longer required or required only to a reduced extent.

Due to the use of UV lamps with reduced output it is also possible to reduce not only the energy consumption but also to increase the service life of the UV lamp and to reduce thus the downtime of such coating devices so that the productivity is increased. While the conventional UV lamps require 2,000 to 3,000 watt, the invention can employ UV lamps of only approximately 800 watt.

A substantial advantage of circular arc-shaped UV lamps is especially apparent during drying of the coating at the edge of the storage medium which is especially critical during the drying process. The circular arc-shape of the UV lamp according the present invention allows a substantially more directed and positioned irradiation of the edge of the storage medium and thus a faster and more uniform drying of the coating medium at the edge area as compared to rod-shaped UV lamps.

According to the invention the radius of the circular arc-shaped UV lamp is greater than the radius of the disc-shaped information storage medium. This improves the uniform radiation distribution across the storage medium and especially also ensures an excellent irradiation of the edge portion of the storage medium. For a radius of, for example, a compact disc of approximately 60 mm, it is advantageous to select a radius of the UV lamp in the range of 80 to 100 mm, and especially of 90 mm.

With respect to an excellent illumination and high radiation efficiency, respectively, optimal positioning of the light onto the storage medium, it is advantageous to embody the arc-shaped UV lamp with a circular segment of up to 180°. Even though circular segments of more than 180° or even a complete circular arc is possible, circular arc segments of up to 180° have proven especially successful with respect to the construction and spacial limitations of such devices with respect to the construction and spacial limitations of such devices.

The circular arc-shaped UV lamp is advantageously arranged in a plane above the plane in which the storage medium is positioned.

This not only ensures that the entire disc surface, but also the edge portion of the disc-shaped storage medium is uniformly irradiated with UV light. The circular arc-shaped UV lamp is arranged preferably concentrically to the disc-shaped storage medium.

According to a further very advantageous embodiment of the invention, a reflector is provided at the side of the disc-shaped information storage medium facing away from the UV lamp, especially within its edge portion, whereby the reflector preferably surrounds the edge portion of the storage medium in a channel-type arrangement. This channel-type reflector is advantageously also arc-shaped, preferably circular arc-shaped and preferably arranged opposite the arc-shaped UV lamp. The reflector reflects the UV light onto the areas of the storage medium that are not directly or not sufficiently irradiated by the UV lamp, especially also to the critical edge area of the storage medium during the drying process. The arc segment of the reflector matches preferably substantially the arc segment of the UV lamp.

The reflector is advantageously manufactured of pressed aluminum, and the aluminum is preferably electro-polished for optimal reflection of the UV radiation.

BRIEF DESCRIPTION OF THE DRAWINGS

The invention will be explained in the following with the aid of the Figures. It is shown in.

DESCRIPTION OF PREFERRED EMBODIMENTS

Figure 1:
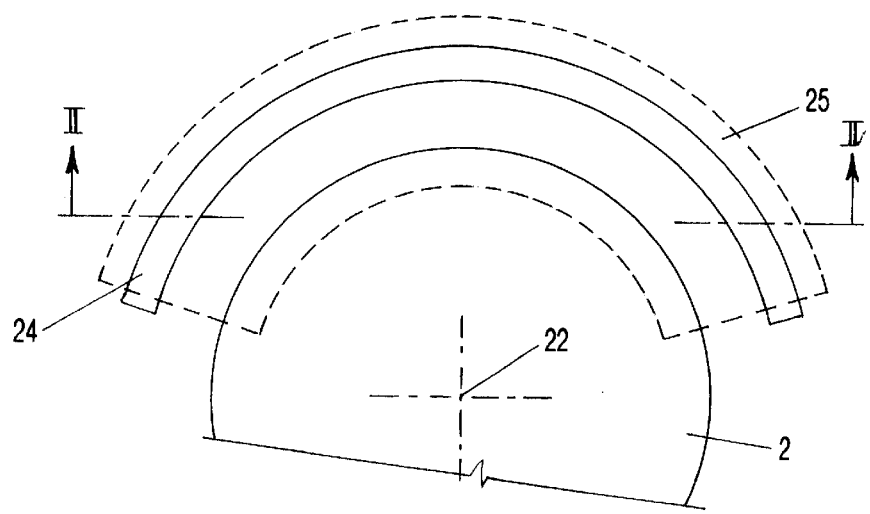
FIG. 1 an embodiment of the inventive circular arc-shaped UV lamp in spacial correlation to a disc-shaped information storage medium in a plan view and in a schematic representation.
Figure 2:
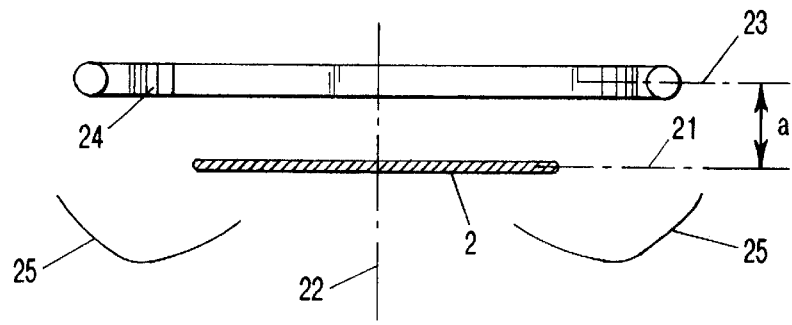
FIG. 2 a sectional view along the section line II—II shown in FIG. 1.
Figure 3:
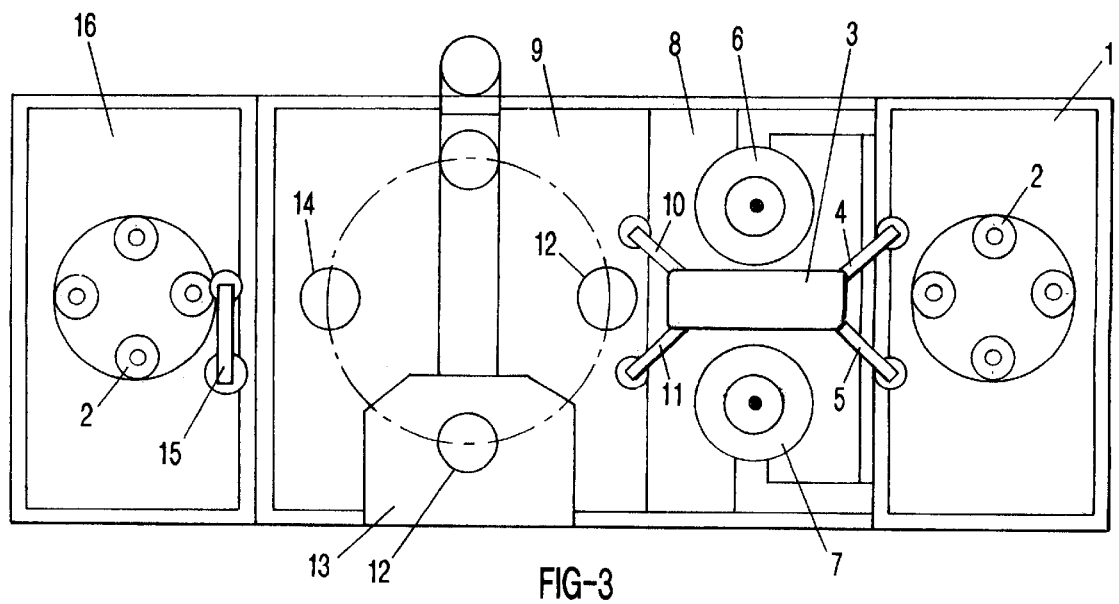
FIG. 3 a schematic representation of a conventional coating device for disc-shaped information storage media.

As can be seen in FIGS. 1 and 2, the disc-shaped information storage medium 2, for example, a CD, is positioned in a plane 21, for example, on a non-represented turntable that rotates about an axis 22. At a spacing a above the storage medium 2 a circular arc-shaped UV lamp 24 is positioned in a plane 23 substantially concentrically to the storage medium 2. The circular arc segment of the UV lamp 24 has a radius which is greater than the radius of the storage medium 2. The arrangement of the circular arc-shaped UV lamp 24 in combination with its greater diameter not only ensures a more uniform irradiation of the disc surface but also of the critical edge portion of the storage medium 2 during radiation.

At the side of the storage medium 2 facing away from the UV lamp 24 a channel-like reflector 25 made of electro-polished and pressed aluminum is provided which is arranged substantially within the same segment area as the UV lamp 24. The reflector 25 reflects the UV radiation emitted by the UV lamp 24 onto the edge portion of the medium 2 which can be reached by the UV radiation emitted by the UV lamp only in a reduced amount or not at all. The reflector 25 ensures thus a uniform drying of the storage medium 2 also within the edge portions and in areas which are facing away from the UV lamp.

Because of the excellent use of the emitted energy of the circular arc-shaped UV lamp as a result of the optimal positioning of the radiation onto the storage medium 2, it is possible to employ for the drying process a reduced total output and/or shorter period of time in comparison to conventional devices. Accordingly, the storage medium 2 is substantially less heated and distortions of the storage medium 2 due to heating are prevented. Also, removal of the resulting heat from the drying chamber is necessary only to a much reduced amount or not at all.

The invention has been explained with the aid of preferred embodiments. However, to a person skilled in the art developments and further embodiments are obvious without deviating from the gist of the invention. For example, it is possible to embody the circular arc-shaped UV lamp 24 and/or the circular arc-shaped reflector 25 not only, as shown, within a circular segment of 180°, but also over a smaller or greater circular arc segment. Furthermore, it is possible to provide above the circular arc-shaped UV lamp a further non-represented reflector, optionally also in circular arc-shape, which directs the light emitted by the UV lamp in the upward direction onto the storage medium 2.

The present invention is, of course, in no way restricted to the specific disclosure of the specification and drawings, but also encompasses any modifications within the scope of the appended claims.

What is claimed is:

1. A device for curing a coated disc-shaped information storage medium with a coating medium, said device comprising:
    a drying station comprising:
        a tubular UV lamp for drying the applied coating medium, said tubular UV lamp being bent into a circular arc shape;
        a support for holding the disc-shaped information storage medium in a plane; and
        a reflector;
    wherein said plane is located between said tubular UV lamp and said reflector, and
    wherein said circular arc shape of said tubular UV lamp has a radius greater than the radius of the disc-shaped information storage medium, and
    wherein said lamp is arranged concentrically to the disc-shaped storage medium.

2. A device according to claim 1, wherein, for a radius of the disc-shaped information storage medium being approximately 60 mm, said radius of said UV lamp is in the range of 80 to 100 mm.

3. A device according to claim 1, wherein said radius of said UV lamp is 90 mm.

4. A device according to claim 1, wherein said UV lamp has a circular arc segment of up to 180°.

5. A device according to claim 1, wherein said UV lamp is arranged at a spacing above the disc-shaped information storage medium.

6. A device according to claim 1, wherein said reflector in the edge area of the information storage medium is channel-shaped in cross-section and opens in a direction toward said tubular UV-lamp.

7. A device according to claim 1, wherein said reflector is arc-shaped in a plan view.

8. A device according to claim 1, wherein said arc shape of said reflector matches a circular arc shape of said UV lamp.

9. A device according to claim 7, wherein said reflector consists of pressed aluminum.

10. A device according to claim 9, wherein the aluminum is electro-polished.

11. A device according to claim 1, further comprising a device for rotating the disc-shaped information storage medium during the drying process.

* * * * *